(12) United States Patent
Fingler et al.

(10) Patent No.: US 7,206,392 B2
(45) Date of Patent: Apr. 17, 2007

(54) FIBER OPTIC PREMISE WIRING SYSTEM

(75) Inventors: Larry Fingler, 6 Old Forge Drive, King City, Ontario (CA) L7B 1K4; Iain Galloway, Stratford (CA); Nadine Sutcliffe, Stratford (CA)

(73) Assignee: Larry Fingler, King City, Ontario (CA)

( * ) Notice: Subject to any disclaimer, the term of this patent is extended or adjusted under 35 U.S.C. 154(b) by 750 days.

(21) Appl. No.: 10/365,593

(22) Filed: Feb. 12, 2003

(65) Prior Publication Data

US 2004/0156582 A1    Aug. 12, 2004

(51) Int. Cl.
*H04M 11/00* (2006.01)

(52) U.S. Cl. .............................. 379/93.15; 379/90.01; 379/93.08

(58) Field of Classification Search ............ 379/93.15, 379/90.01, 93.08, 93.09, 93.01, 93.05, 93.07, 379/27.06, 93.14
See application file for complete search history.

(56) References Cited

U.S. PATENT DOCUMENTS 6,154,774 A * 11/2000 Furlong et al. ............. 709/224

6,515,995 B1 * 2/2003 Kim .......................... 370/395.6

FOREIGN PATENT DOCUMENTS

EP         763910 A2 *  3/1997

* cited by examiner

*Primary Examiner*—Melur Ramakrishnaiah
(74) *Attorney, Agent, or Firm*—Connolly Bove Lodge & Hutz LLP

(57) ABSTRACT

A premise wiring system comprises a backend communications system including telephony capabilities and at least one communications device configured for electrical signalling. A signal conversion system acts between the backend communications system and the at least one communications system. The signal conversion system converts electrical signalling being exchanged between the at least one communications device and the backend communications system into optical signalling for transmission over a fiber optic link and reconverts the optical signalling into electrical signalling for delivery to the at least one communications device and the backend communications system.

6 Claims, 11 Drawing Sheets

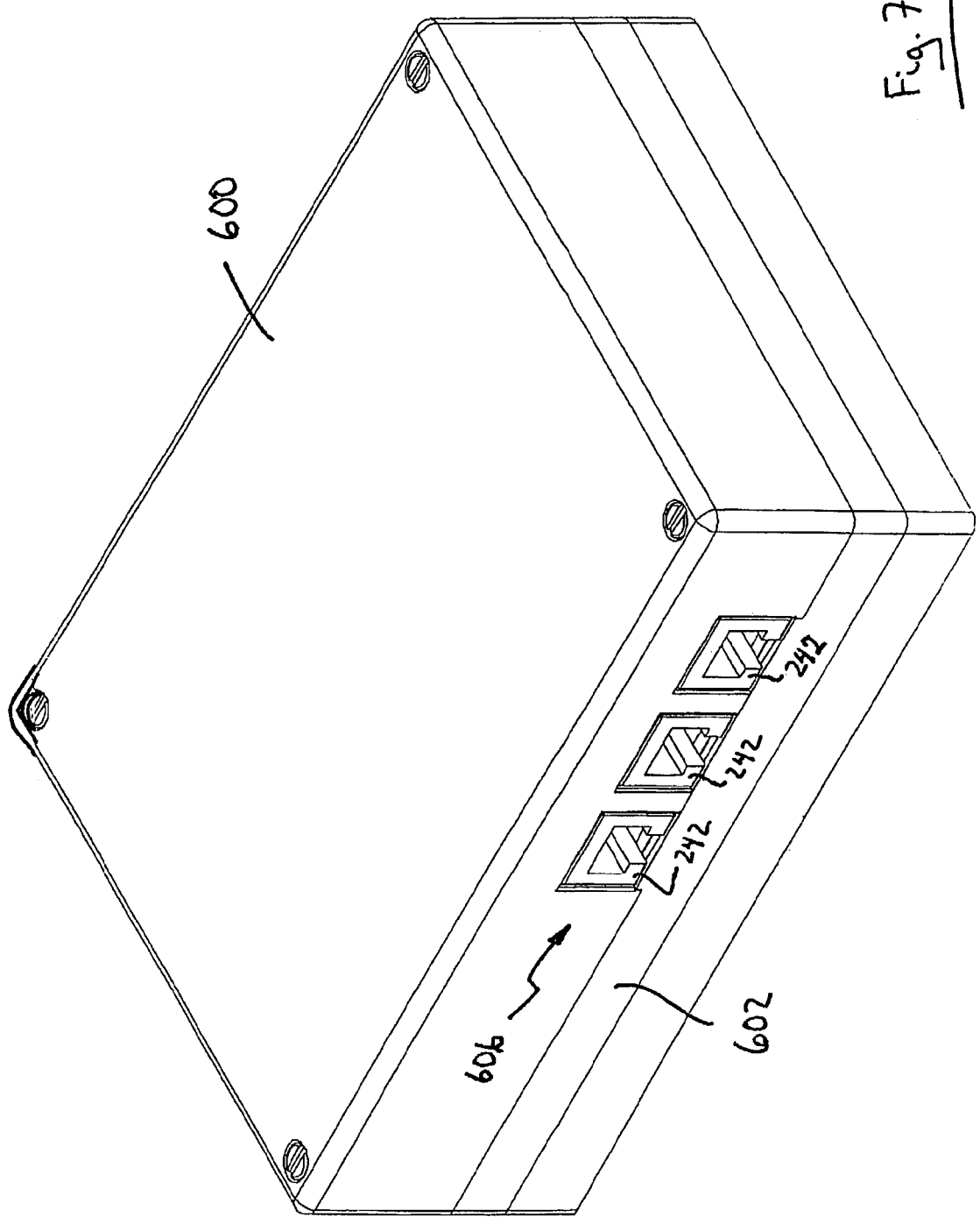

FIBER OPTIC PREMISE WIRING SYSTEM

FIELD OF THE INVENTION

The present invention relates generally to communications and in particular to a fiber optic premise wiring system. The present invention also relates to a system for converting electrical signals to optical signals and back to electrical signals to enable communications devices configured for electrical communications to communicate over a fiber optic link.

BACKGROUND OF THE INVENTION

Today's businesses rely significantly on communications and a variety of technologies to access, convey and process information. This need puts a premium on information technology that increases communications speed and bandwidth.

It is well known that fiber optic cable provides significant advantages over its copper cable counterpart. Fiber optic cable has increased capacity and less signal degradation as compared to copper cable, requires less maintenance and is more difficult to tap into. Despite these advantages, most current information technology used for voice and data communications does not require the use of fiber optic cable to interconnect with communications devices, nor do suppliers of such information technology promote use of fiber optic cable. Copper cable manufacturers to-date have had a significant amount of success in improving communications over existing or slightly improved copper cable. As a result, copper cabling has not been a bottleneck in terms of communications speed and bandwidth and therefore, has not been a deciding factor in forcing a move from copper cable to fiber optic cable. Further, since current information technology generally does not require fiber optic cable for high or optimum performance and since applications that require fiber optic cable are limited, the push to move from copper cable to fiber optic cable has been limited notwithstanding the advantages associated with fiber optic cable discussed above.

During construction of new facilities and renovations of older facilities, fiber optic backbones are often installed on the assumption that copper cabling will eventually be replaced with fiber optic cabling. In fact it is anticipated that within the next five (5) to ten (10) years, most communications systems will make use of fiber optic networks that bring fiber to the desk i.e. use fiber optic cable to interconnect communications devices to the backend supporting information technology.

Installing fiber optic cable and components within a premise is a costly investment. These significant costs have made businesses hesitant to convert to fiber optic cable at this time. As will be appreciated, a need therefore exists for a cost effective solution to install fiber optic cable within premises to allow businesses to switch to fiber optic cable now so that they may enjoy the benefits associated with fiber optic cable while facilitating the switch when the change to fiber optic cable becomes necessary.

It is therefore an object of the present invention to provide a novel fiber optic premise wiring system. It is also an object of the present invention to provide a novel system for converting electrical signals to optical signals and back to electrical signals to enable communications devices configured for electrical communications to communicate over a fiber optic link.

SUMMARY OF THE INVENTION

According to one aspect of the present invention there is provided a signal conversion system for communications comprising:

a front-end interface into which at least one communications device configured for electrical signalling is to be connected;

a backend interface to be connected to a backend electrical signal based communications system; and a fiber optic link interconnecting said front-end and backend interfaces, wherein electrical signalling between a communications device connected to said front-end interface and a backend communications system connected to said backend interface is converted by said front-end and backend interfaces into optical signalling for transmission therebetween and is reconverted by said front-end and backend interfaces to electrical signalling for transmission to said communications device and backend communications system.

Preferably, the front-end interface is designed to accommodate a plurality of different types of communications devices. In the preferred embodiment, the front-end interface includes a first subsystem having a series of jacks into which different communications devices are to be plugged and circuitry to support the jacks; and a second subsystem including a processor to process signals received from and destined to the communications devices, a switch to control signal flow, and at least one fiber optic transceiver to convert optical signals received from the fiber optic link into electrical signals and to convert electrical signals received from the processor into optical signals.

The backend interface includes a third subsystem having a series of jacks into which the backend communications system is to be plugged and circuitry to support the jacks; and a fourth subsystem including a processor to process signals received from and destined to the communications devices, a switch to control signal flow and at least one fiber optic transceiver to convert optical signals received from the fiber optic link into electrical signals and to convert electrical signals received from the processor into optical signals.

In a preferred embodiment, the switch of the front-end interface and the switch of the backend interface is an Ethernet switch. The front-end and backend interfaces communicate over the fiber optic link via an Internet protocol (IP) connection.

It is also preferred that the first and second subsystems are modular and mounted on separate circuit boards within the front-end interface and that the third and fourth subsystems are modular and mounted on separate circuit boards within the backend interface. The separate circuit boards in the front-end and backend interfaces are preferably releasably connected via mating card connectors.

According to another aspect of the present invention there is provided a premise wiring system comprising:

a backend communications system including telephony capabilities;

at least one communications device configured for electrical signalling; and a signal conversion system acting between said backend communications system and said at least one communications device, said signal conversion system converting electrical signalling being exchanged between said at least one communications device and said backend communications system into optical signalling for transmission over a fiber optic link and reconverting said optical signalling into electrical signalling for delivery to said at least one communications device and said backend communications system.

The present invention provides advantages in that by coupling the communications devices to the backend communications system through fiber optic cable, space requirements for the same carrying capacity as compared with copper cable are reduced. Furthermore by using fiber optic cable to interconnect the communications devices and the backend communications system, communications capacity is increased, maintenance costs and electromagnetic/radio frequency interference (EMI/RFI) are reduced and security is increased due to the fact that it is more difficult to tap into fiber optic cable than copper cable. Also, by running fiber optic cable, safety is increased since the risk of electrical fire is removed.

The present invention also provides advantages in that longer cable runs between communications devices and the backend communications system can be made without requiring signal amplification components resulting in lower wiring system costs. Also, in cases where the fiber optic cable is installed before it is necessary to convert to fiber optical cable, future conversion costs will be reduced when it becomes necessary to convert to fiber optic cable.

The present invention provides further advantages in that since the fiber optic cable terminates either at wallboxes or surface mount boxes that provide high quality terminations, installation is facilitated. Also, since the subsystems within the front-end and backend interfaces are modular, they can be easily installed and replaced by technicians with minimal training.

BRIEF DESCRIPTION OF THE DRAWINGS

Embodiments of the present invention will now be described more fully with reference to the accompanying drawings in which:

FIG. 6b is a perspective view of the wallbox of FIG. 6a;

FIGS. 7b and 7c are front and rear elevation views respectively of the surface mount box of FIG. 7a; and FIG. 7d is a bottom plan view of the surface mount box of FIG. 7a.

DETAILED DESCRIPTION OF THE PREFERRED EMBODIMENTS

The present invention relates generally to a fiber optic premise wiring system for communications such as for example voice, data, video etc. Fiber optic cable is used as the communications medium to interconnect communications devices such as telephones, facsimile machines and computer workstations to a backend communications system. To avoid investment in optical component upgrades, modular interfaces are provided between the communications devices and the fiber optic cable as well as between the fiber optic cable and the backend communications system that perform appropriate electrical signal to optical signal to electrical signal conversion. Preferred embodiments of the present invention will be described; however for ease of reference a brief discussion of a conventional copper premise wiring system and a conventional combined copper and fiber optic premise wiring system will firstly be made with reference to FIGS. 1 and 2.

Figure 1:
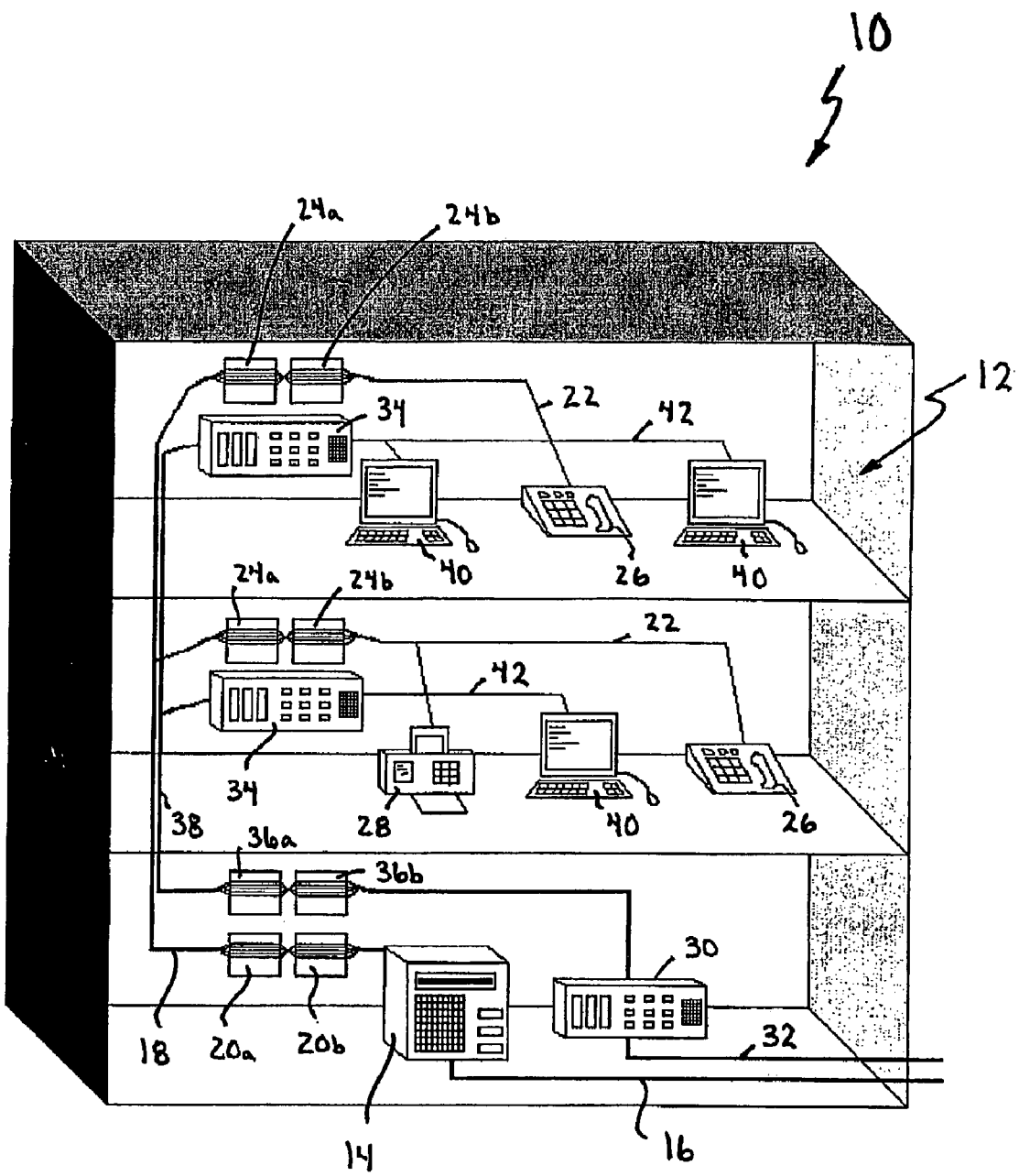
FIG. 1 is a schematic illustration of a standard prior art copper premise wiring system within a building.

Turning now to FIG. 1, a multi-story building 10 wired with a standard prior art copper premise wiring system 12 to provide the building with communications facilities is shown. As can be seen, copper premise wiring system 12 includes a main telephone switch 14 that receives an incoming copper telecommunications cable 16 entering the building 10. The telephone switch 14 is connected to a copper distribution cable 18 via a pair of patch panels 20*a* and 20*b*. Runs of copper cable 22 are connected to the copper distribution cable 18 via patch panels 24*a* and 24*b* and terminate at jacks (not shown) positioned throughout the building 10. Communications devices such as telephones 26 and facsimile machines 28 are connected to the jacks.

An active computer network component 30 such as a server also receives an incoming copper telecommunications cable 32 entering the building 10. Computer network component 30 is connected to other computer network components 34 positioned throughout the building 10 via a pair of patch panels 36*a* and 36*b* and a copper distribution cable 38. Computer workstations 40 are connected to the computer network components 34 via runs of copper cable 42. In this manner, the telephones 26, facsimile machines 28 and computer workstations 40 communicate with a backend communications system over copper cable connections.

Figure 2:
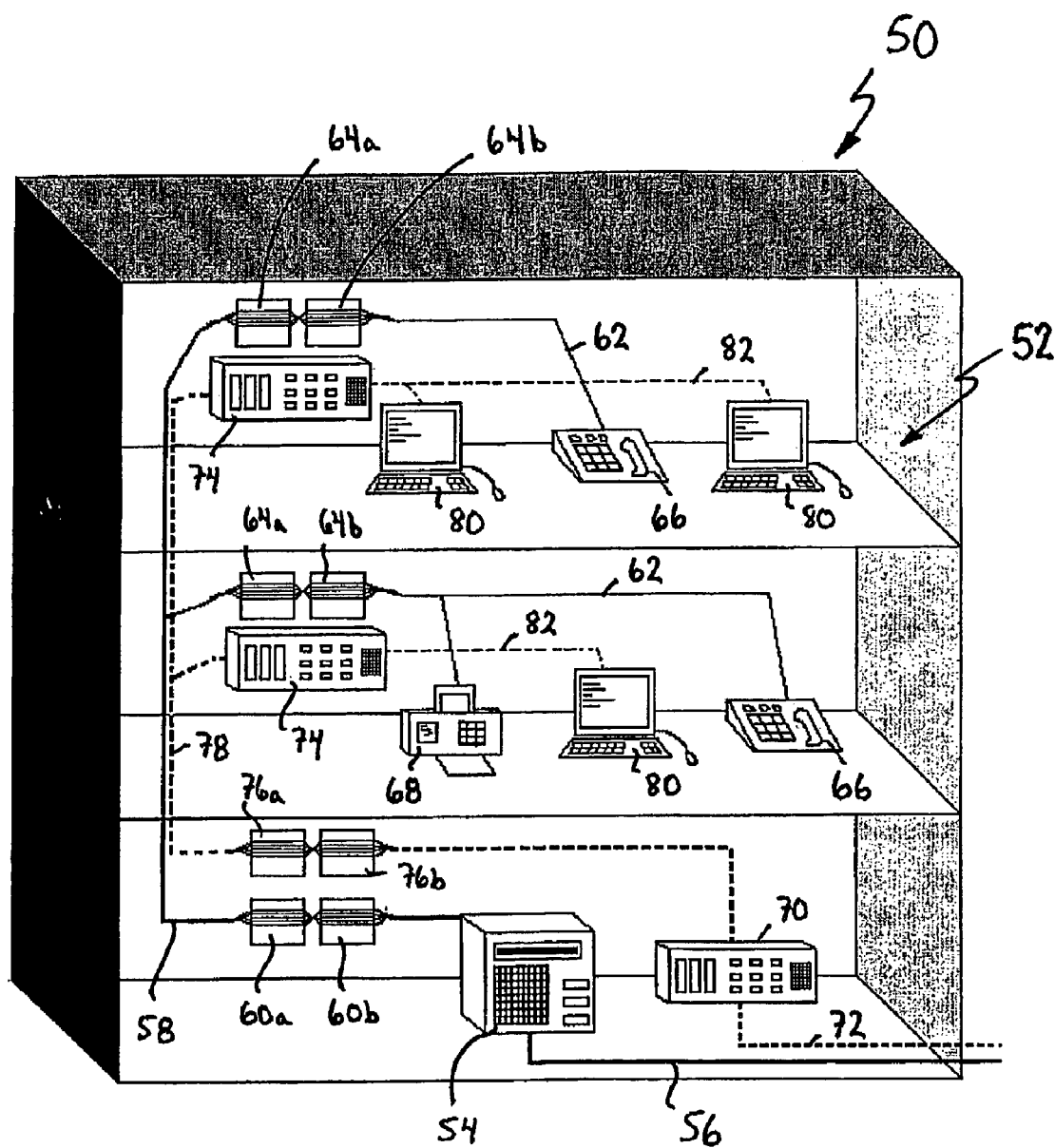
FIG. 2 is a schematic illustration of a standard prior art combined copper and fiber optic premise wiring system within a building.

FIG. 2 shows another multi-story building 50 wired with a standard combined copper and fiber optic premise wiring system 52 to provide the building with communications facilities. As can be seen, combined copper and fiber optic premise wiring system 52 similarly includes a main telephone switch 54 that receives an incoming copper telecommunications cable 56 entering the building 50. The telephone switch 54 is connected to a copper distribution cable 58 via a pair of patch panels 60*a* and 60*b*. Runs of copper cable 62 are connected to the copper distribution cable 58 via patch panels 64*a* and 64*b* and terminate at jacks (not shown) positioned throughout the building 50. Telephones 66 and facsimile machines 68 are connected to the jacks.

An active computer network component 70 such as a server receives an incoming fiber optic telecommunications cable 72 entering the building 50. Computer network component 70 is connected to other computer network components 74 positioned throughout the building 50 via a pair of patch panels 76*a* and 76*b* and a fiber optic distribution cable 78. Computer workstations 80 are connected to the computer network components 74 via runs of fiber optic cable 82. In this manner, the telephones 66 and facsimile machines 68 communicate with a backend communications system over copper cable connections while the computer workstations 80 communicate with a backend communications system over fiber optic cable connections.

Although the premise wiring systems 12 and 52 shown in FIGS. 1 and 2 adequately support communications at present, when the switch from copper cable to fiber optic cable becomes mandatory, the costs associated with converting these premise wiring systems fully to fiber optic cabling will be significant.

To facilitate the future switch from copper cabling to fiber optic cable, the present fiber optic premise wiring system has been conceived. The costs to implement the present fiber optic premise wiring system are comparable with the costs associated with installing a conventional copper premise wiring system. The present fiber optic premise wiring system will however significantly reduce the costs to switch over to fiber optic cabling when it becomes mandatory to do so. Preferred embodiments of the present invention will now be described with particular reference to FIGS. 3 to 7d.

Figure 3:
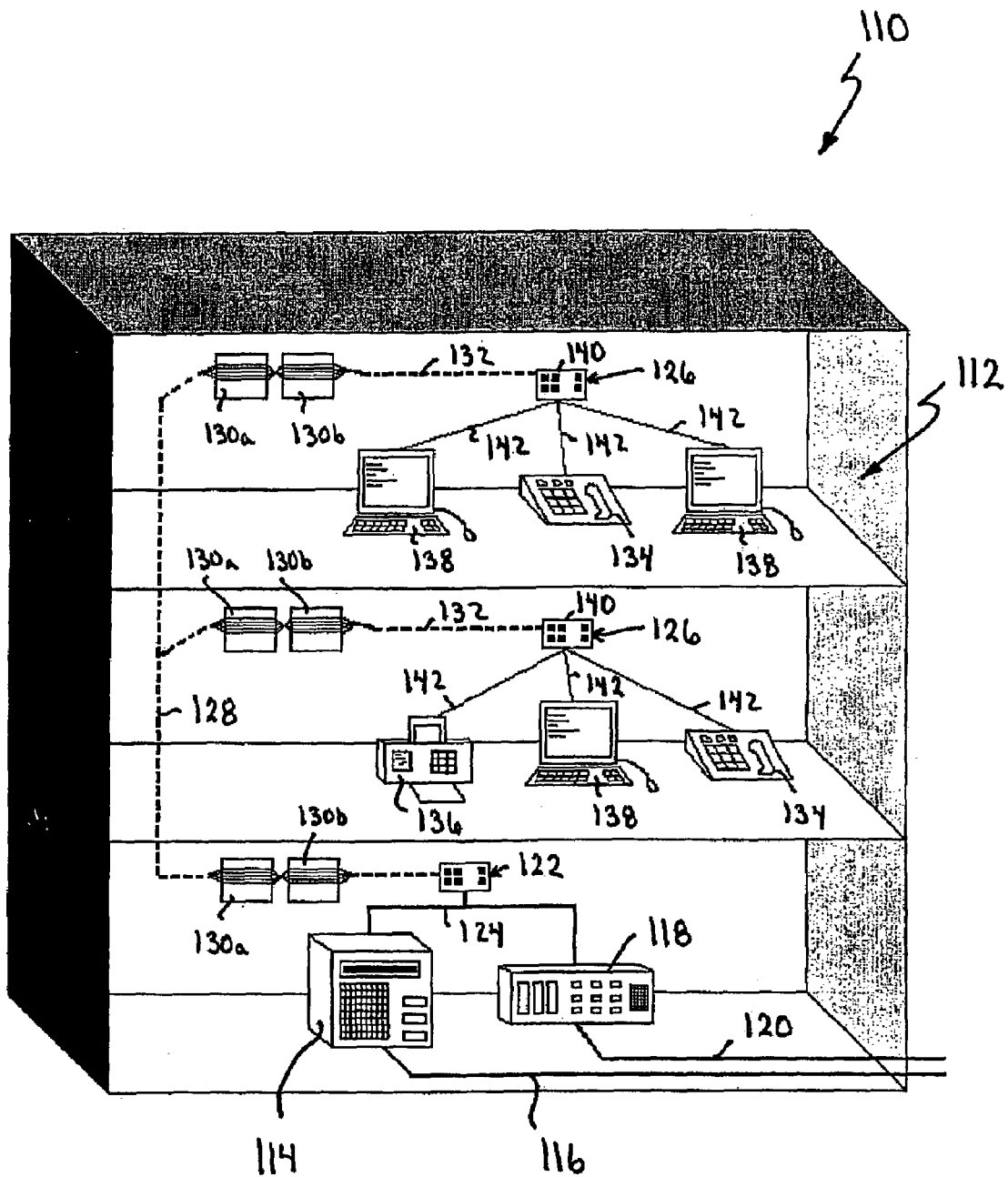
FIG. 3 is a schematic illustration of a fiber optic premise wiring system within a building in accordance with the present invention.

Turning to now to FIG. 3, a multi-story building 110 wired with a fiber optic premise wiring system 112 in accordance with the present invention to provide the building with communications facilities is shown. As can be seen, fiber optic premise wiring system 112, similar to the premise wiring system of FIG. 1, includes a main telephone switch 114 that receives an incoming copper telecommunications cable 116 entering the building 110 and an active computer network component 118 such as a server that receives an incoming copper telecommunications cable 120. The telephone switch 114 and active computer network component 118 are connected to a backend interface 122 via copper cables 124. The backend interface 122 is connected to front-end interfaces 126 positioned throughout the building 110 via a fiber optic distribution cable 128, pairs of patch panels 130a and 130b and runs of fiber optic cable 132. Communications devices such as telephones 134, facsimile machines 136 and computer workstations 138 are connected to the front-end interfaces 126.

The backend and front-end interfaces 122 and 126 respectively form a signal conversion system to convert electrical signals to optical signals and back to electrical signals to allow the communications devices to communicate with a backend communications system over fiber optic connections. The front-end interfaces 126 in this embodiment are accommodated within wallboxes 140 (see FIGS. 6a and 6b) housing an array of jacks designed to accommodate the various different types of communications devices. The telephones 134, facsimile machines 136 and computer workstations 138 are plugged into the jacks of the wallboxes 140 via conventional copper terminal connections 142. As will be appreciated, unlike the prior art premise wiring system 52 illustrated in FIG. 2, in the present fiber optic premise wiring system 112, all communications devices are coupled to a backend communications system through fiber optic cable rather than through multiple cables handling voice and data separately. As a result, when it becomes necessary to switch fully to fiber optic communications, it is only necessary to modify the backend and front-end interfaces 122 and 126, making the switch easy and affordable. The present invention also reduces the requirement for floor space allotted to communications closets.

Figure 4A:
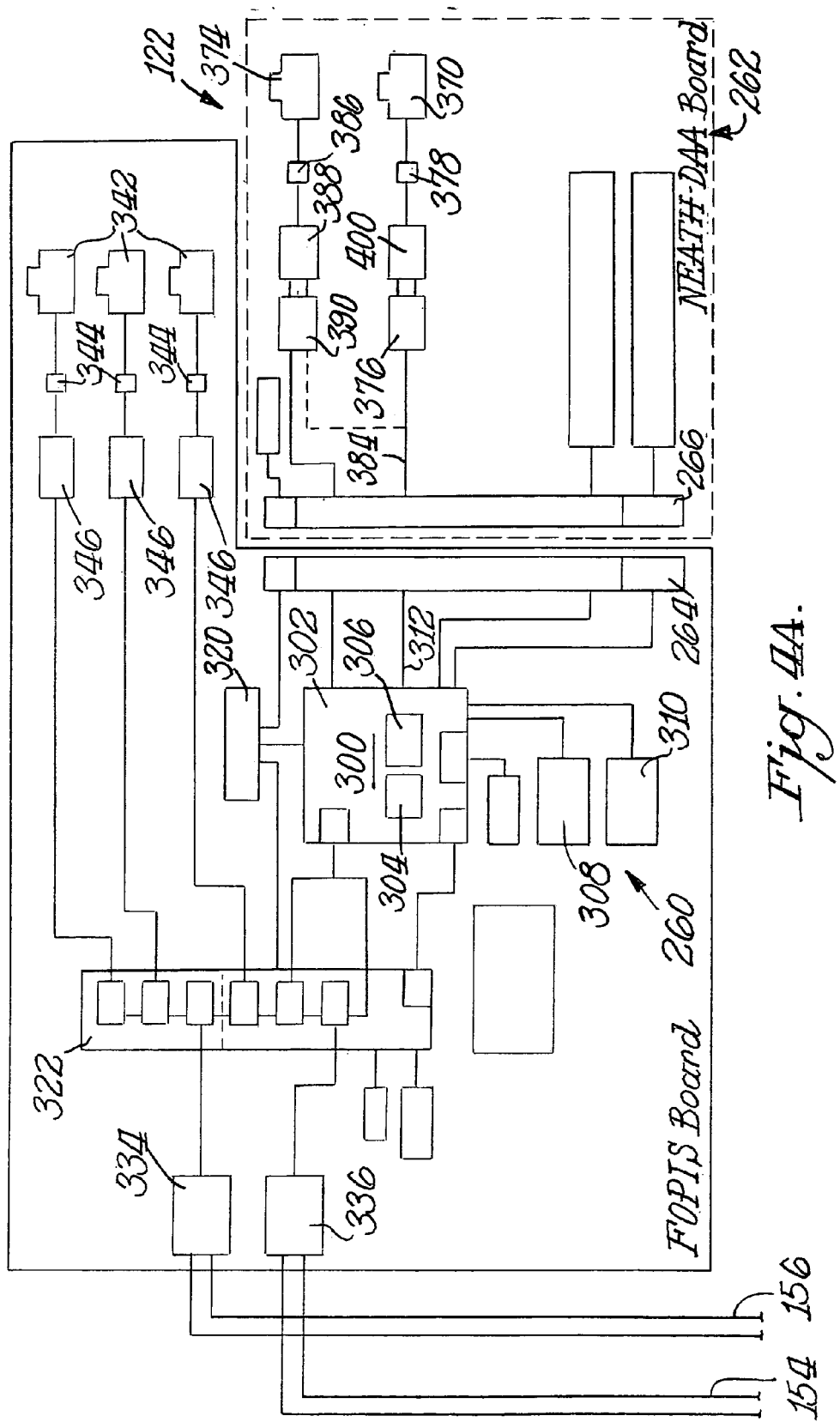
FIG. 4 is a schematic block circuit diagram of a signal conversion system including front-end and backend modular interfaces showing the interconnection between a wallbox and a backend communications system forming part of the fiber optic premise wiring system of FIG. 4.
Figure 4B:
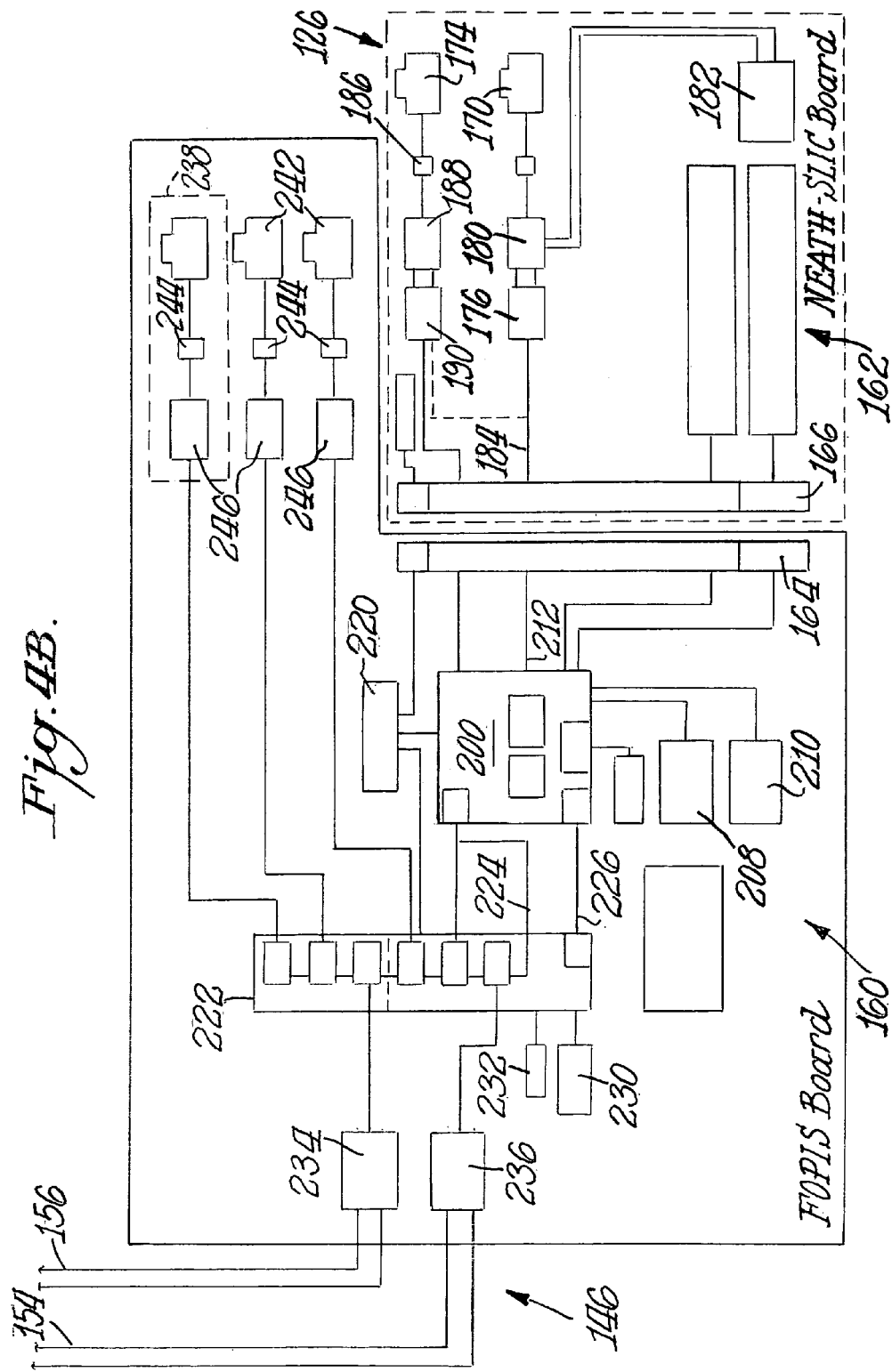
Figure 5:
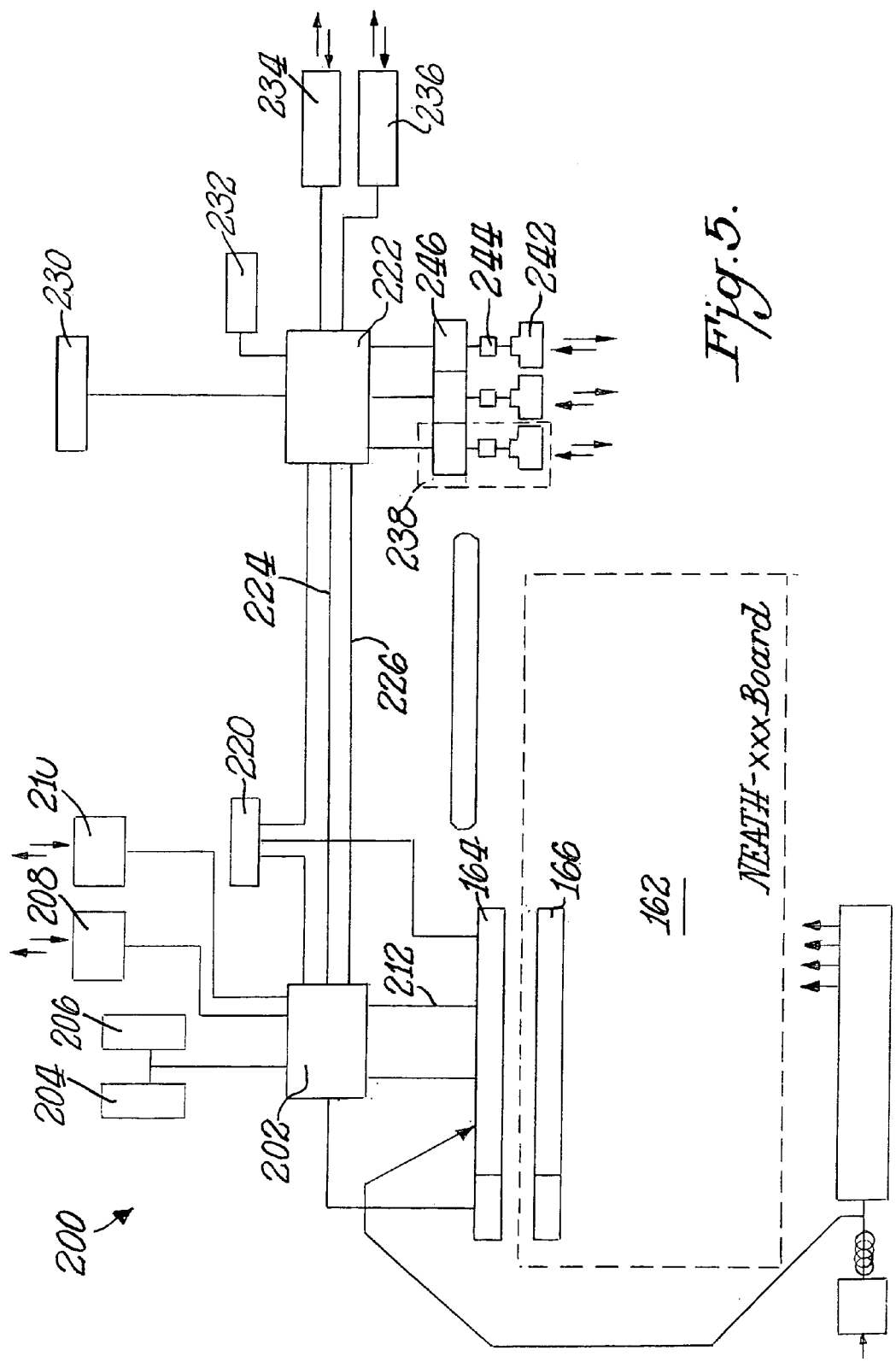
FIG. 5 is an enlarged schematic block circuit diagram of a portion of FIG. 4.

Referring now to FIGS. 4 and 5, a schematic block circuit diagram of the backend interface 122 and one of the front-end interfaces 126 is shown. The front-end interface 126 and backend interface 122 are coupled by a fiber optic link 146 forming part of the fiber optic cable run 132 and the fiber optic distribution cable 128. In this particular embodiment, the fiber optic link 146 includes two fiber optic pairs 154 and 156. Each fiber optic pair 154, 156 includes a transmit (Tx) fiber and a receive (Rx) fiber.

The front-end interface 126 includes a pair of interconnected interface subsystems, namely a fiber optic premise interface (FOPI) subsystem 160 and a telephony device interface (TDI) subsystem 162. The FOPI and TDI subsystems 160 and 162 are modular and are mounted on separate circuit boards. The two circuit boards are releasably connected through mezzanine circuit board card connectors 164 and 166 carried on the circuit boards.

TDI subsystem 162 in the present embodiment includes an RJ45 analog telephone jack 170 to receive the copper terminal connection 142 from a standard analog telephone, and an RJ45 digital telephone jack 174 to receive the copper terminal connection 142 from a digital telephone. The analog telephone jack 170 is coupled to a coder/decoder (Codec) 176 via a high voltage (HV) protection circuit 178 and a subscriber line interface circuit (SLIC) 180. The SLIC circuit 180 is also coupled to the tip and ring lines extending from the telecommunications power supply 182. The Codec 176 is coupled to the mezzanine circuit board card connector 166 via a general circuit interface (GCI) 184.

The digital telephone jack 174 is also connected to the mezzanine circuit board card connector 166 via an HV protection circuit 186 and interface circuits 188 and 190 to interface with a backend digital telephone system. The interface circuits 188 and 190 may be memory mapped or include a GCI 184.

FOPI subsystem 162 includes a central processing unit (CPU) 200 running an embedded Linux operating system. CPU 200 includes a main processor 202, flash read only memory (ROM) 204, dynamic random access memory (DRAM) 206, a debug serial port 208 and a debug Ethernet port 210. The main processor 202 is coupled to the mezzanine circuit board card connector 164 via a GCI 212. When the mezzanine circuit board card connectors 164 and 166 matingly engage, the GCIs 184 and 212 are interconnected. The GCIs 184 and 212 provide a framed communications facility between the Codec 176 and the CPU 200.

The main processor 202 is also connected to a reset supervisor 220 and to an Ethernet switch 222 via a media access control (MAC) interface 224 and a serial peripheral interface (SPI) 226. The Ethernet switch 222 provides output to a bank of status indicators in the form of light emitting diodes (LEDs) 230 and is connected to a configuration electrically erasable programmable read only memory (EEPROM) 232, a pair of fiber optic transceivers 234 and 236, and three 10/100 BaseT transceivers 238. Each 10/100 BaseT transceiver 238 includes an RJ45 10/100 BaseT Ethernet jack 242, an HV protection circuit 244 and a magnetic circuit 246. The fiber optic transceivers 234 and 236 are each coupled to a respective one of the fiber optic pairs 154 and 156.

The backend interface 122 also includes a pair of interconnected interface subsystems, namely a FOPI subsystem 260 and a telecommunications equipment interface (TEI) subsystem 262. The FOPI and TEI subsystems are similarly modular and mounted on separate circuit boards that are releasably connected through mezzanine circuit board card connectors 264 and 266 carried on the circuit boards.

The FOPI subsystem 260 of the backend interface 122 includes a CPU 300 running an embedded Linux operating system. The CPU 300 similarly includes a main processor 302, flash ROM 304, DRAM 306, a debug serial port 308 and a debug Ethernet port 310. The main processor 302 is connected to a reset supervisor 320 and to an Ethernet switch 322. The Ethernet switch 322 communicates with a bank of status indicators in the form of LEDs 330, configuration EEPROM 332, a pair of fiber optic transceivers 334 and 336 as well as three 10/100 BaseT transceivers. Each of the 10/100 BaseT transceivers includes an RJ45 10/100 BaseT Ethernet jack 342, an HV protection circuit 344 and a magnetic circuit 346 and is associated with a respective one of the transceivers 238. The fiber optic transceivers 334 and 336 similarly are each coupled to a respective one of the fiber optic pairs 154 and 156.

The main processor 302 is also coupled to the mezzanine circuit board card connector 264 via a GCI 312. When the mezzanine circuit board card connector 264 matingly engages with the mezzanine circuit board card connector 266 of the TEI subsystem 262, the GCI 312 is connected to the GCI 384 of the TEI subsystem 262.

The TEI subsystem 262 includes a Codec 376 coupled to the GCI 384. An RJ45 analog jack 370 is coupled to the Codec 376 via an HV protection circuit 378 and a data access arrangement (DAA) 400 to interface with the backend communications system. An RJ45 digital jack 374 is also connected to the mezzanine circuit board card connector 266 through an HV protection circuit 386 and custom interface circuits 388 and 390. The jack 370 receives incoming copper analog POTs lines (not shown) and the jack 374 connects to a line leading to a digital telephone switch.

Figure 6A:
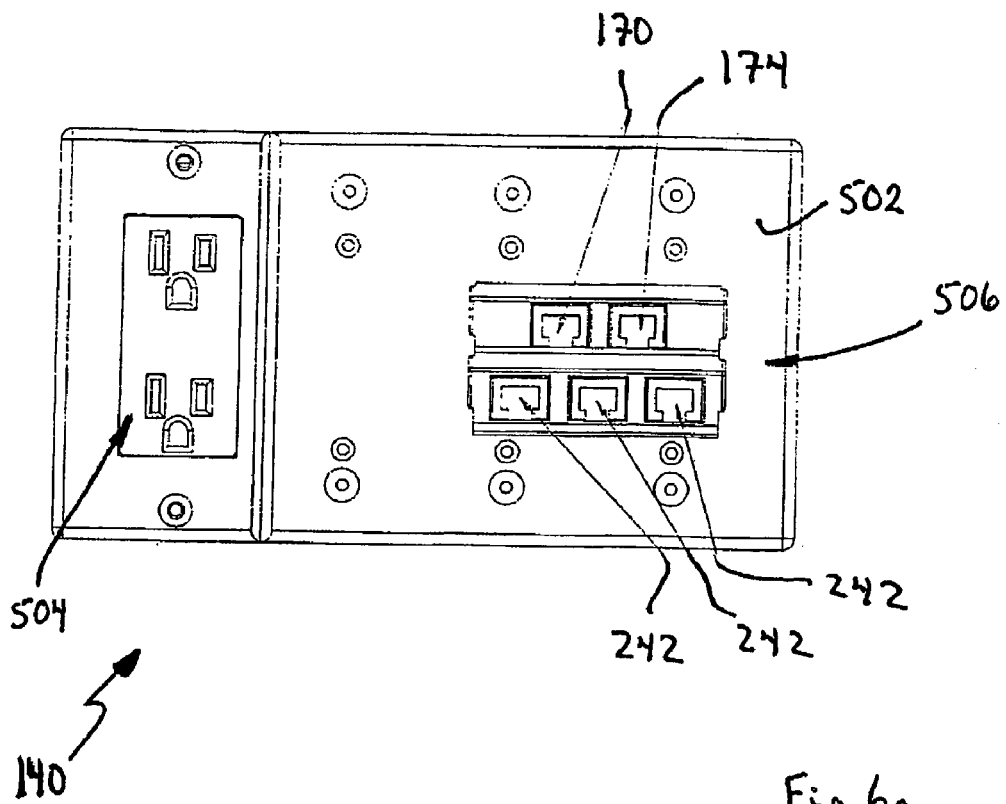
FIG. 6a is a front elevation view of a wallbox forming part of the fiber optic premise wiring system of FIG. 4.
Figure 6B:
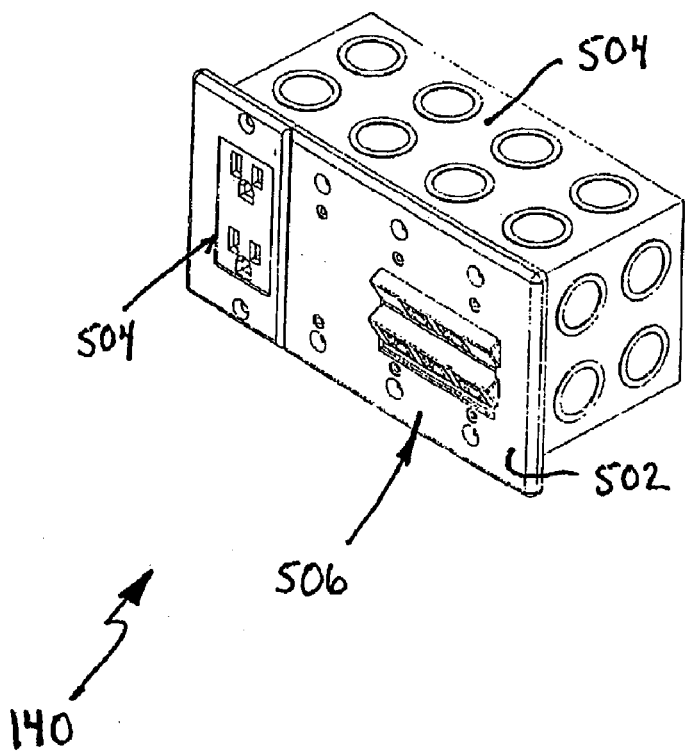
Figure 7B:
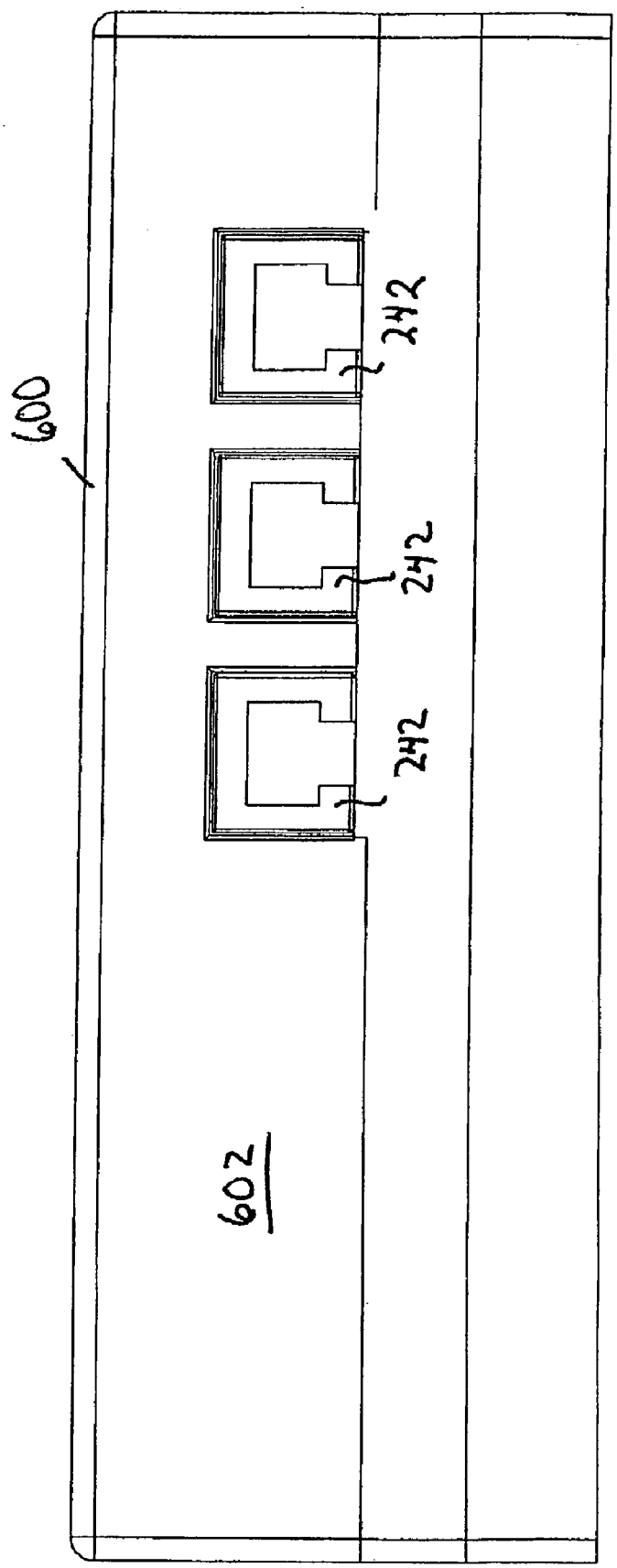
Figure 7C:
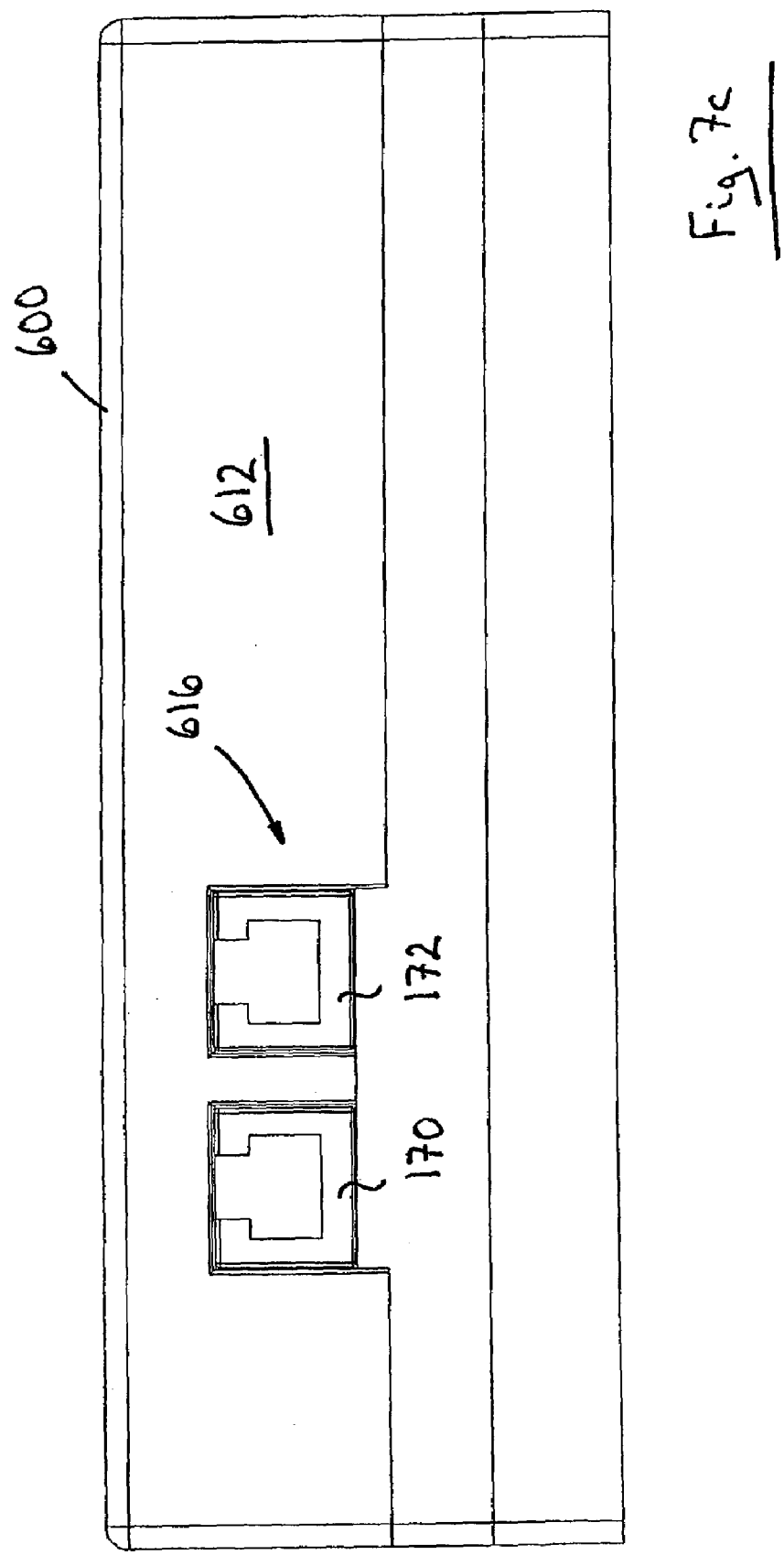
Figure 7A:
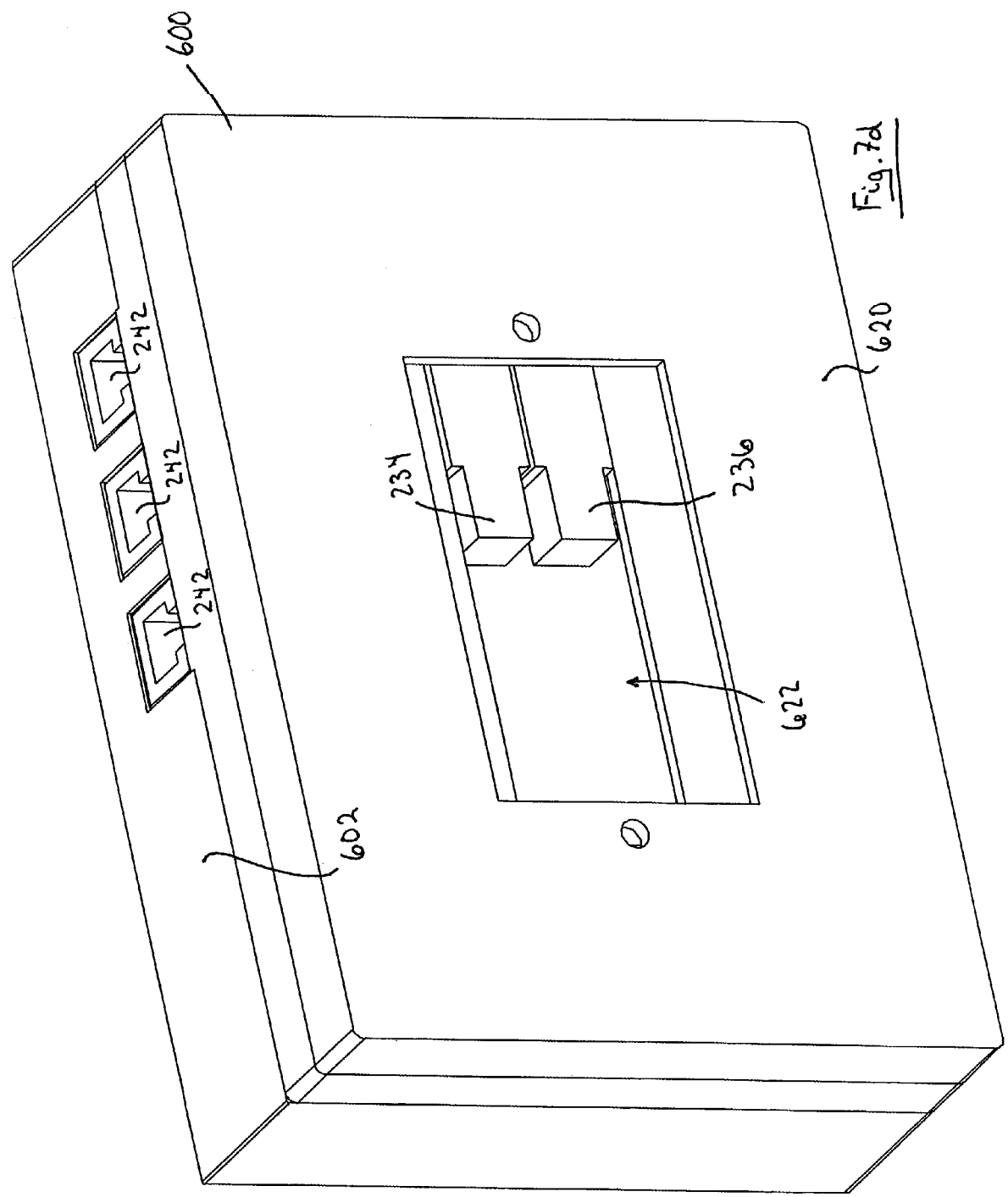
FIG. 7a is a perspective view of a surface mount box forming part of a fiber optic premise wiring system in accordance with the present invention.

Turning now to FIGS. 6a and 6b, a wallbox 140 housing one of the front-end interfaces 126 is better illustrated. As can be seen the wallbox 140 includes a generally rectangular masonry housing 500 having a front face panel 502 through which conventional 110 volt power supply sockets 504 are exposed. An array 506 of jacks including two rows of jacks is also exposed. The jacks in the bottom row of the array 506 include the RJ45 10/100 BaseT Ethernet jacks 242. The jacks in the top row of the array 506 include the RJ45 analog telephone jack 170 and the RJ45 digital telephone jack 174.

During powerup of the signal conversion system, the operating systems of the CPUs 200 and 300 in the backend and front-end interfaces 122 and 126 respectively go through initialization. During this initialization process, the backend and front-end interfaces 122 and 126 establish a communications relationship using an appropriate communications protocol. In the present embodiment, the backend and front-end interfaces 122 and 126 communicate using Internet Protocol (IP). Accordingly during initialization, IP addresses assigned to the backend and front-end interfaces 122 and 126 are exchanged by the CPUs 200 and 300 over the fiber optic link 146 and a client server relationship between the backend and front-end interfaces 122 and 126 is negotiated to establish an IP link therebetween. Daemons are used by the Linux operating system running on the CPUs 200 and 300 to control and maintain communications between the backend and front-end interfaces 122 and 126. The Linux operating system separates communications into two tasks, namely a transmit task and a receive task. Transmit tasks are carried out over the transmit (Tx) fibers of the fiber optic pairs 154 and 156. Receive tasks are carried out over the receive (Rx) fibers of the fiber optic pairs 154 and 156. Each fiber defines a single direction combined voice and data channel.

When the signal conversion system is in an idle state, regular IP traffic passes between the backend and front-end interfaces 122 and 126 over the fiber optic pairs 154 and 156 in a conventional manner allowing computer workstations 138 plugged into the jacks 242 to communicate with a backend communications system.

When a telephone 134 or facsimile machine 136 that is connected to a jack 170 goes off hook, the off-hook condition is detected by the SLIC 180 and the CPU 200 is notified of the off-hook condition. The CPU 200 in turn opens an IP link with the backend interface 122 that was established during initialization. Quality of service is then invoked on the Ethernet switch 222 as required to tag Ethernet packets. As the outgoing number is dialled, the dialled number is managed by the SLIC 180 and sent to the CPU 200. The CPU 200 in turn conveys the dialling sequence to the Ethernet switch 222. The Ethernet switch 222 in turn routes the dialling sequence to the appropriate fiber optic transceiver 234, 236 which converts the dialling signals from electrical to optical form and transmits the signals over the transmit fiber of the selected fiber optic pair 154, 156 via the established IP link.

When the backend interface 122 receives the optical signals, the received optical signals are converted back into electrical signals by the fiber optic transceiver 334, 336 before being conveyed to the Ethernet switch 322. From the Ethernet switch 322, the dialling sequence is conveyed to the CPU 300. The CPU 300 in turn opens an outgoing line connection to the backend communications system via the Codec 376, DAA 400 and HV protection circuit 378 and then transmits the dialling sequence to the backend communications system. Ringing signals and progress tones received by the backend interface 122 from the backend communications system are returned back to the SLIC 180 in a similar manner.

When the call is answered and a communication connection with the called party has been established, voice and/or data signals are sent back and forth between the backend and frond end interfaces 122 and 126 over the transmit and receive fibers of the selected fiber optic pair 154, 156 via the established IP link for the remainder of the call. When an onhook state of the telephone 134 or facsimile machine 136 is detected by the SLIC 180, the call is terminated and the backend and front-end interfaces 122 and 126 return to the idle state.

When an incoming call directed to one of the telephones 134 or facsimile machines 136 is received from the backend communications system, the incoming ringing signals are detected by the DAA 400. The DAA 400 in turn notifies the CPU 300, which in turn opens a previously established IP link with the front-end interface 126. Similarly, quality of service is invoked on the Ethernet switch 322 as required. The CPU 300 conveys the ringing signals to the Ethernet switch 322. The Ethernet switch 322 in turn routes the ringing signals to the appropriate fiber optic transceiver 334, 336 which converts the signals from electrical to optical form and transmits the signals over the transmit fiber of the selected fiber optic pair 154, 156 via the established IP link.

When the front-end interface 126 receives the optical signals, the received optical signals are converted back into electrical signals by the fiber optic transceiver 234, 236 before being conveyed to the Ethernet switch 222. From the Ethernet switch 222, the ringing signals are conveyed to the CPU 200. The CPU 200 in turn conveys the ringing signals to the jack 170 via the Codec 176, SLIC 180 and HV protection circuit 178 causing the communications device connected to the jack to ring. Call status/progress signalling and ringing/progress tones are sent back to the backend interface 122 over the IP link in the same manner.

When the call is answered and a communication connection with the calling party has been established, voice and/or data signals are sent back and forth over the transmit and receive fibers of the selected fiber optic pair 154, 156 via the IP link for the remainder of the call. When the call is terminated and the telephone 134 or facsimile machine 136 returns to an on-hook condition, the on-hook condition is detected by the SLIC 180. The SLIC 180 in turn notifies the CPU 200, which in turn signals the CPU 300 allowing the backend and front-end interfaces 122 and 126 to return to the idle state.

Incoming and outgoing communications using a digital telephone plugged into jack 174 are carried out in a manner similar to that described above.

As will be appreciated, the signal conversion system allows communications devices configured for electrical signal communications, to communicate with a backend communications system over a fiber optic link through modular interfaces. When the need arrives to switch the premise wiring fully to optical, only the interfaces need be replaced due to the fact that the underlying fiber optic link between the backend communications system and the communications devices is provided. Replacing the interfaces is an easy task due to their modular configuration. This will greatly help to reduce the future costs associated with the switch to fully fiber optics.

Although the TDI subsystem 162 of the front-end interfaces 126 is described as including one RJ45 analog telephone jack 170 and one RJ45 digital jack 174, those of skill in the art will appreciate that the TDI subsystem 162 may include more or fewer of each type of jack. Also, if desired additional circuitry can be provided in the TDI subsystems 162 to support enhanced telephony features.

If desired, the TDI subsystems 162 may be provided with local wireless interfaces such as Bluetooth, 802.11, or IrDA to enable wireless devices to communicate with the backend communications system through the backend and front-end interfaces 122 and 126 in the same manner described above. Control ports can also be provided on the TDI subsystems 162 to permit heating, ventilation and security systems to be controlled through the signal conversion system.

In the preferred embodiment, the Codec 176 is described as communicating with the CPU 200 over GCIs 184 and 212. If desired, an interchip digital link (IDL) interface may be used instead of the GCIs.

The fiber optic cable used as the link between the backend and front-end interfaces 122 and 126 respectively may either be single-mode or multi-mode fiber optic cable. Although single-mode fiber is more expensive, longer fiber optic length cable runs are possible.

In the embodiment described above, the runs of fiber optic cable 132 are described as terminating at wallboxes 140. If desired, one or more of the runs of the fiber optic cable 132 may terminate at a surface mount box into which communications devices are plugged as shown in FIGS. 7a to 7d. As can be seen, the surface mount box includes a generally rectangular housing 600 having a front panel 602 accommodating an array 606 of jacks. The jacks in the array 606 include the RJ45 10/100 BaseT Ethernet jacks 242. The rear panel 612 of the housing 600 accommodates another array 616 of jacks. The jacks in the array 616 include the RJ45 analog telephone jack 170 and the RJ45 digital telephone jack 174. The bottom 620 of the housing 600 has an opening 622 therein to expose the fiber optic transceivers 234 and 236 allowing the surface mount box to be coupled to the fiber optic link 146.

Although preferred embodiments of the present invention have been described, those of skill in the art will appreciate that variations and modifications may be made without departing from the spirit and scope thereof as defined by the appended claims.

What is claimed is:

1. A signal conversion system for communications comprising:
   a front-end interface into which at least one communications device configured for electrical communications is to be connected;
   a backend interface to be connected to a backend electrical signal based communications system; and
   a fiber optic link interconnecting said front-end and backend interfaces, wherein electrical signalling between a communications device connected to said front-end interface and a backend communications system connected to said backend interface is converted by said front-end and backend interfaces into optical signalling for transmission therebetween and is reconverted by said front-end and backend interfaces to electrical signalling for transmission to said communications device and backend communications system, wherein said front-end interface includes:
   a first subsystem having a series of jacks into which different communications devices are to be plugged and circuitry to support said jacks and detect off-hook conditions of said communications devices; and
   a second subsystem including a processor to process signals received from and destined to said communications devices, a switch to control signal flow, and at least one fiber optic transceiver to convert optical signals received from said fiber optic link into electrical signals and to convert electrical signals received from said processor into optical signals; and wherein said backend interface includes:
   a third subsystem having a series of jacks into which said backend communications system is to be plugged and circuitry to support said jacks and detect incoming ringing signal conditions; and
   a fourth subsystem including a processor to process signals received from and destined to said communications devices, a switch to control signal flow and at least one fiber optic transceiver to convert optical signals received from said fiber optic link into electrical signals and to convert electrical signals received from said processor into optical signals.

2. A signal conversion system according to claim 1 wherein the switch of said front-end interface and the switch of said backend interface is an Ethernet switch, said front-end and backend interfaces communicating over said fiber optic link using Internet protocol (IP).

3. A signal conversion system according to claim 1 wherein said first and second subsystems are modular and are mounted on separate circuit boards within said front-end interface and wherein said third and fourth subsystems are modular and are mounted on separate circuit boards within said backend interface.

4. A signal conversion system according to claim 3 wherein the separate circuit boards in said front-end and backend interfaces are releasably connected via mating card connectors.

5. A signal conversion system according to claim 4 wherein said front end interface is mounted within a wallbox.

6. A signal conversion system according to claim 4 wherein said front-end interface is mounted within a surface mount box.

* * * * *